(No Model.)

W. F. SMITH.
GAS DISTRIBUTING PIPE.

No. 333,353. Patented Dec. 29, 1885.

Witnesses
Chas. H. Davis
John C. Jenkins

Inventor
William F. Smith
By his Attorney
C. N. Alexander

United States Patent Office.

WILLIAM F. SMITH, OF PITTSBURG, PENNSYLVANIA.

GAS-DISTRIBUTING PIPE.

SPECIFICATION forming part of Letters Patent No. 333,353, dated December 29, 1885.

Application filed November 7, 1885. Serial No. 182,147. (No model.)

*To all whom it may concern:*

Be it known that I, WILLIAM F. SMITH, a citizen of the United States, residing at Pittsburg, in the county of Allegheny and State of Pennsylvania, have invented certain new and useful Improvements in Gas-Distributing Pipes, of which the following is a specification, reference being had therein to the accompanying drawings.

My invention relates to improvements in gas-distribution, and is designed to produce a means for preventing leakage in gas or other pipes, more especially such as would be weakened by the cutting of a thread on the ends thereof during the conveyance of said gas under pressure.

Figure 1:
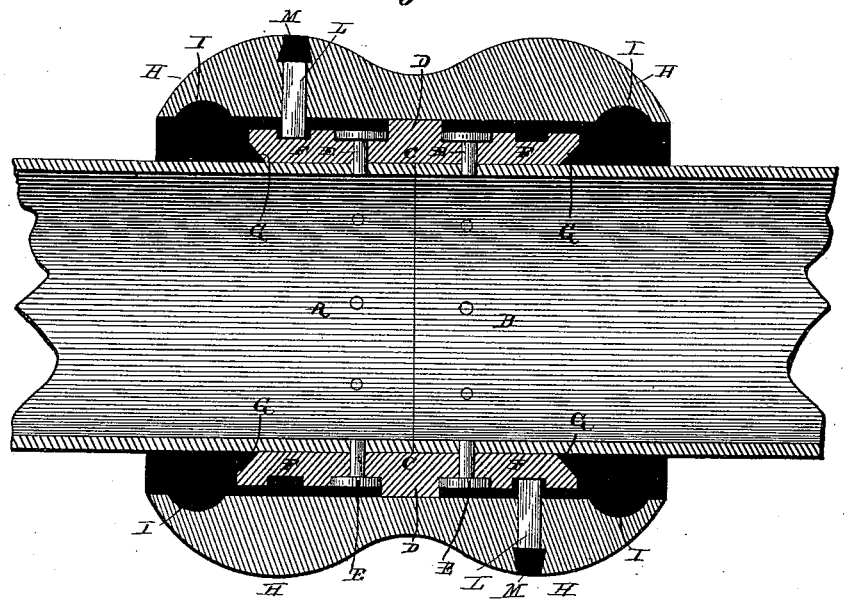
Figure 2:
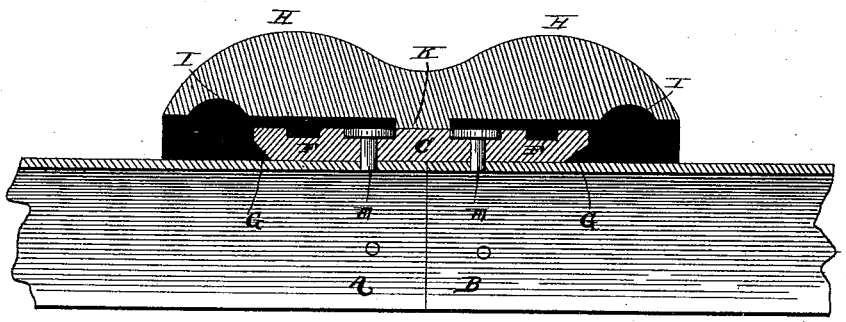

In the accompanying drawings, Figure 1 represents a longitudinal section of the contiguous ends of coupled pipes and the coupling used on the same, and Fig. 2 a similar view showing a slightly-modified construction.

The pipes are designated in the drawings by A and B. Surrounding the contiguous ends is a collar, C, having a central exterior annular shoulder or flange, D, extending outward from said collar C.

On each side of the shoulder D and parallel therewith are countersunk holes for the bolts or rivets E, which extend through the collar C and into the pipes A and B, and the heads of which are preferably flush with the surface of said collar. Near each end of said collar C is an annular groove, F, and the ends or edges of the collar have each an undercut bevel, G.

Surrounding the collar C and extending beyond the ends thereof is a sleeve, H, having near each end an interior annular groove, I.

In Fig. 1 the interior surface of the sleeve H is plain, excepting the grooves I, and it rests centrally on the shoulder D of the collar.

In Fig. 2 the shoulder D on the said collar is omitted and a central annular shoulder or flange, K, is formed on the interior of said sleeve H, and rests centrally on the said collar C. Either form may be used and in each case a space is left between the sleeve and collar on each side of the central shoulder. The calking is inserted at each end of the sleeve after the collar and bolts or rivets have been placed and the said sleeve properly located. The said calking fills the space between the collar and sleeve, except that occupied by the central shoulder, and, passing over the heads of the bolts or rivets, holds them firmly in place and prevents leakage at this point. The calking also enters the grooves F and holds the collar firmly in place, and also prevents the said calking from loosening. The grooves I are also filled by the said calking, which thereby prevents any slipping of the said sleeve. The bevels G act as wedges to force the calking tightly around the ends of the collar, thus preventing all leakage therefrom.

Passing through the sleeve H at one or more points and entering the groove F is a bolt or bar, L, capped with cementing material, as shown at M. This device completely locks the sleeve and collar together and takes all strain from the calking material.

I claim—

1. The combination, with a collar immediately surrounding the contiguous ends of pipes, of bolts or rivets passing through said collar and into the pipes, a surrounding sleeve exterior to said collar and receiving calking material, and an intermediate central shoulder, substantially as specified.

2. The combination, with a collar immediately surrounding the contiguous ends of pipes, and having a central annular exterior shoulder, of bolts or rivets passing through said collar and into the pipes, and a surrounding sleeve for receiving calking material, substantially as specified.

3. The combination, with a collar surrounding the contiguous ends of pipes, bolts or rivets countersunk into said collar and entering the pipes, a sleeve surrounding the collar and raised therefrom by a central shoulder, and calking material filling the intervening space and covering the said bolts or rivets, substantially as specified.

4. The combination, with a collar surrounding the contiguous ends of pipes, and having near each end an annular groove, and at each end an undercut bevel, of bolts or rivets passing through said collar and into the pipes, a surrounding sleeve with grooves near each end, a shoulder raising said sleeve from said collar, and calking material filling the intervening space, entering the grooves and bevels, and covering the bolt or rivet heads, substantially as specified.

5. The combination in a pipe-joint, of a collar immediately surrounding the contiguous ends of the pipes, an exterior sleeve, an intermediate filling of calking material, and locking bolts or bars extending from the sleeve to the collar, substantially as specified.

6. The combination of a collar immediately surrounding the contiguous ends of pipes, and having annular grooves near the ends, an exterior sleeve, an intermediate filling of calking material, and locking bolts or bars extending from the sleeve to the collar and seated in the said grooves, substantially as specified.

In testimony whereof I affix my signature in presence of two witnesses.

WM. F. SMITH.

Witnesses:
SAML. W. BLAND,
MILTON I. BAIRD.